Oct. 3, 1939.　　　　G. H. ACKER　　　2,175,047

REDUCTION GEAR CONTROL

Filed Feb. 18, 1936

INVENTOR.
George H. Acker
BY
Fay, Oberlin & Fay
ATTORNEYS.

Patented Oct. 3, 1939

2,175,047

UNITED STATES PATENT OFFICE 2,175,047

REDUCTION GEAR CONTROL

George H. Acker, Shaker Heights, Ohio, assignor to The Cleveland Worm and Gear Company, Cleveland, Ohio, a corporation of Ohio Application February 18, 1936, Serial No. 64,533

5 Claims. (Cl. 192—150)

The present invention relates to means for controlling the torque and load applied to a power transmission unit, and particularly, of a worm gear reduction unit. The general object and nature of the invention is to provide torque responsive means for protecting a reduction gear unit against over-load, and also to provide means for controlling the torque or load distribution over a series of reduction gear units which might be installed, for example, as multiple drives for a conveying system.

More specifically stated, the invention comprises a worm gear reduction unit wherein the worm shaft is capable of slight longitudinal movement dependent upon the amount of torque transmitted, and means for translating such longitudinal movement into the actuation of a control mechanism, such as an electric motor control switch whereby a driving means, such as an electric motor may be regulated as to power delivered to the worm gear reduction unit. Additional objects and advantages of the invention shall become apparent as the following description proceeds.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
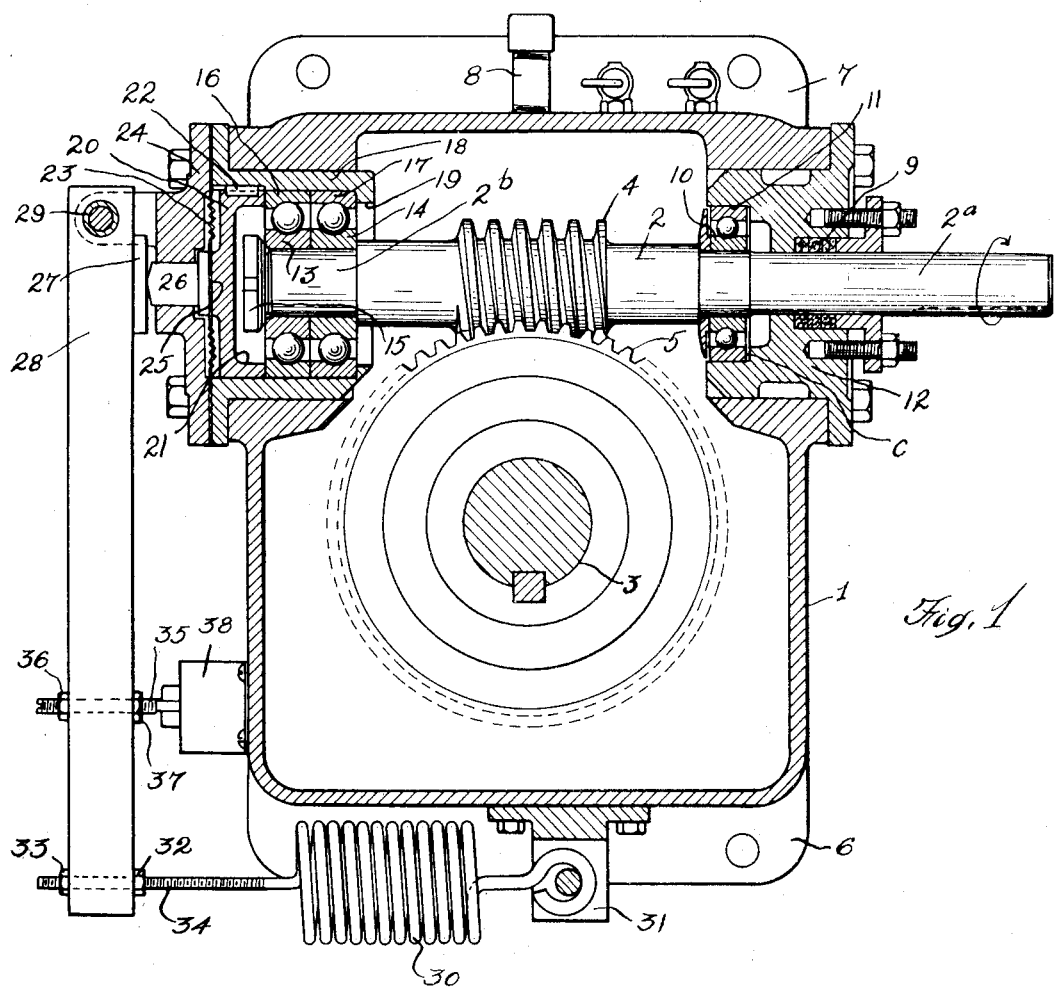
Figure 2:
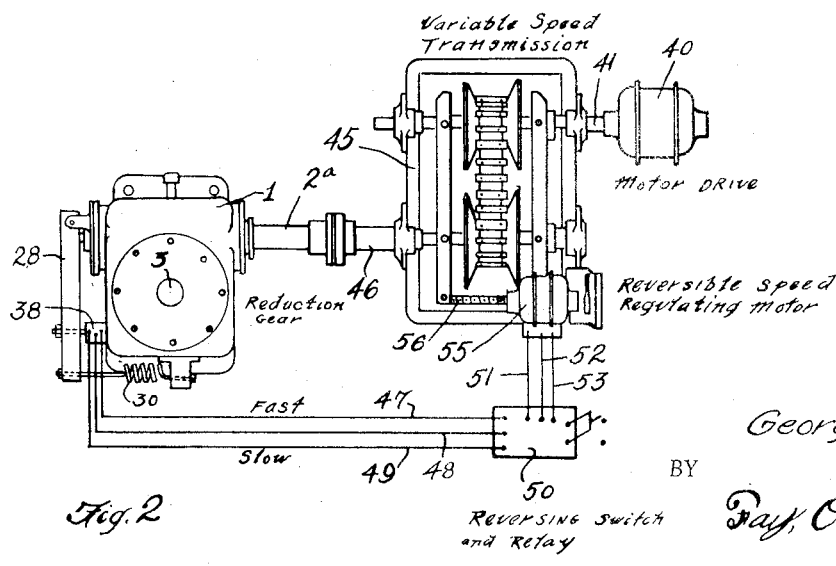

In said annexed drawing:

Fig. 1 is a sectional view illustrating an embodiment of the invention as applied to a worm gear reduction unit; Fig. 2 is a view, more or less diagrammatic, illustrating the incorporation of the invention as applied to the control of the power input of a reduction gear unit wherein the power is delivered through a variable speed transmission.

Now referring more particularly to Fig. 1, the structure shown therein includes a housing 1 in which the worm shaft 2 and worm gear shaft 3 are journalled. The worm 4 is of course carried by the worm shaft 2 and the worm gear 5 is carried by the shaft 3. Mounting feet 6 and 7 are provided on the housing 1 for the purpose of locating the unit on a suitable support or base. The interior of the housing 1 constitutes an enclosed oil reservoir, access to which is gained through the pipe 8.

The right hand end of the worm shaft 2 extends through to the exterior of the housing 1, as indicated at 2a and constitutes the driving end of the shaft which is customarily connected to a prime mover such as an electric motor or variable speed transmission. The shaft driving end 2a is sealed in the wall of the housing by means of an oil tight packing gland 9. The driving end 2a of the worm shaft 2 is also journalled in the housing 1 by means of a radial ball bearing whose inner race 10 is press fitted to the shaft and whose outer race 11 makes a slide fit in the separable sleeve member 12 mounted in the wall of the housing 1. It will be noted that there is a slight clearance space C between the right hand radial face of the outer bearing race 11 and the adjacent radial face of the sleeve member 12.

The left hand or rear end of the worm shaft 2 is supported in a pair of ball thrust bearings, the inner races 13 and 14 of which are locked to the neck 2b of the shaft by means of the nut 15. The outer races 16 and 17 of the bearings have a free sliding fit in a supporting sleeve 18 mounted in the wall of the housing 1. An inwardly directed lip or flange 19 on the sleeve 18 serves as an abutment limiting the right hand or inward movement of the bearings.

A cup-shaped member 20 is slidably mounted in the sleeve 18 and has an annular flange 21 adapted to abut against and be contacted by the radial face of the outer bearing race 16. The cup-shaped member 20 is prevented from rotating by means of a key 22 engaging with the inner wall of the sleeve 18.

A flexible corrugated diaphragm 23 is mounted adjacent the cup-shaped member 20 and secured to the wall of the housing 1 by means of the enclosing cap member 24. The diaphragm 23 is preferably fabricated from sheet metal and has a low resistant flexibility, sufficient to allow approximately $\frac{1}{16}$ inch movement and is for the purpose of sealing the interior of the housing 1 against oil leakage. An equivalent element adapted to accomplish the same function as the diaphragm 23 might consist of a leather oil seal mounted on the periphery of the plunger 26. The cup-shaped member 20 has a centrally raised portion or "anvil" 25 which contacts the central portion of the diaphragm 23. A hardened steel plunger 26 is slidably mounted in the cap member 24. One end of the plunger 26 contacts with the diaphragm 23 at a point in line with the anvil 25, and the other end of the plunger 26 contacts with the hardened steel wear plate 27 on the lever 28.

The lever 28 is pivotally mounted to the housing at the point 29 and its opposite end is connected to a tension spring 30. The tension spring 30 has one end connected to the bracket 31 on the housing 1 and its other end adjustably connected to the lever 28 by means of the nuts 32 and 33 engaging the threaded portion of the spring stem 34. Intermediate of the ends of the lever 28, it is connected to the threaded stem 35 by means of the adjusting nuts 36 and 37. The threaded stem 35 contacts with the actuating plunger (not shown) of the electric control switch 38. In the operation of the above-described mechanism, the worm shaft 2 will be rotated by a prime mover in the direction of the arrow as indicated in Fig. 1. Such rotation, when a resistant load is placed upon the worm gear shaft 3, will have a tendency to force the worm shaft 2 in a left hand direction or inwardly against the angular contact thrust bearings, carrying the outer races 16 and 17 thereof against the cup-shaped member 20 against the diaphragm 23, against the plunger 26 and finally against the pivoted lever 28. Movement of the pivoted lever 28 through the last-described transmittal of longitudinal movement of the worm shaft 2 will be effective to operate the electric control switch 38.

When the above-described mechanism is employed as a protective device against overload, the electric control switch 38 may be in the form of a one-way limit switch electrically connected in series to the motor driving the worm shaft 2. The tension of the spring 30 will normally tend to maintain the lever 28 in fixed position against the longitudinal end thrust of the worm shaft 2. But when the longitudinal thrust of the shaft 2 increases or approaches an over-loaded condition, as might be the case when the load on the shaft 3 were increased, the resistance of the tension spring 30 will be overcome and the lever 28 moved outwardly to actuate the electric control switch and thereby stopping the driving motor. In this manner any sudden over-load placed upon the reduction gear unit and even the driving motor itself is prevented from causing injury to the mechanism.

It has not been deemed necessary to show the driving motor and its connection to the shaft 2, together with the electrical connections to the control switch 38, in connection with the last-described application of the invention for the reason that such connections will be obvious to a person skilled in the art.

When the present invention and mechanism constituting an embodiment thereof are utilized as a torque regulating means, an assembly, as more or less diagrammatically illustrated in Fig. 2, may be employed. The assembly shown in Fig. 2 is intended to represent one of a series of multiple driving units which might be installed in a conveying system such as used in the automotive industry. In such a multiple drive conveying system, it is highly desirable that all of the separate drives deliver a uniform torque, so that the load will be evenly distributed to each one of the series of driving units.

Accordingly, in such a torque control installation of a reduction gear driving unit as illustrated in Fig. 2, a drive motor 40 is connected to the driving shaft 41 of a suitable variable speed transmission mechanism 45. The driven shaft 46 of the variable speed transmission 45 is connected to the driving end 2a of the worm shaft of the reduction gear unit 1. The electric control switch 38 of the reduction gear unit is in the form of a two-way limit switch whose terminals are connected by means of the wires 47, 48 and 49 to a reversing switch and relay 50 which may be of customary construction. Wires 51, 52 and 53 lead from the switch and relay 50 to the reversible speed regulating motor 55 of the variable speed transmission 45. The reversible motor 55 operates the threaded shaft 56 and thereby varies the speed transmission ratio of the variable speed transmission 45. Further description of the construction and mode of operation of the variable speed transmission 45 is herewith eliminated since it is well known in the art.

The operation of the last described application of the invention is as follows:

When the load in the reduction gear increases beyond the desired set limit, the lever 28 will be moved in a left hand direction against the tension of the spring 30 whereby the contacts of the control switch 38 will be "made" and close the circuit between the wires 48 and 49. This circuit on being closed will actuate the reversing switch and relay 50 which in turn will actuate the reversible speed regulating motor 55 and thereby change the ratio of the variable speed transmission 45 so that the driven shaft 46 and drive shaft 2a of the reduction gear rotate at a slower speed. In this manner, the torque output of the reduction gear will be automatically held within its maximum predetermined limit.

Conversely when the load on the reduction gear falls below the minimum predetermined limit, the tension spring 30 will move the lever 28 in a right hand or inward direction and correspondingly close the other set of contacts in the control switch 38 whereby the circuit through the wires 47 and 48 is closed. Closing of this latter circuit in turn actuates the reversing switch and relay 50 and the reversible speed regulating motor 55 in order to again change the ratio of the variable speed transmission and increase the speed of rotation of the shafts 46 and 2a. Thus the torque output of the reduction gear is automatically prevented from exceeding its predetermined minimum limit.

Normally the lever 28 will remain in an intermediate position and both of the contacts of the double acting switch 38 will remain open, thereby maintaining the remainder of the control mechanism inactive and the ratio of the variable speed transmission 45 at a constant value.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a worm gear reduction unit, the combination of a housing, a worm shaft mounted in said housing with a slight clearance for relative longitudinal movement, said shaft having a rear end and a driving end, said rear end being enclosed in said housing, a lever pivotally mounted to the exterior of said housing adjacent the rear end of said shaft, an electric motor connected to said driving end, an electric switch connected to said lever, non-rotatable, movable means mounted in the wall of said housing and connecting said rear end of said shaft to said lever, means for locking said movable means against rotation in said housing but permitting longitudinal movement thereof, said lever being connected to said switch whereby said switch is operated upon longitudinal movement of said shaft.

2. In a worm gear reduction unit, the combination of a housing, a worm shaft mounted in said housing with a slight clearance for relative longitudinal movement, said shaft having a rear end and a driving end, said rear end being enclosed in said housing, a lever pivotally mounted to the exterior of said housing adjacent the rear end of said shaft, an electric motor connected to said driving end, an electric switch connected to said lever, non-rotatable, movable means mounted in the wall of said housing and being adapted to be moved by longitudinal movement of said shaft, means for locking said movable means against rotation in said housing but permitting longitudinal movement thereof, means for sealing the interior of said housing adjacent said movable means, said movable means being connected to said lever and said lever being connected to said switch whereby said switch is operated upon longitudinal movement of said shaft.

3. In a worm gear reduction unit, the combination of a housing, a worm shaft mounted in said housing with a slight clearance for relative longitudinal movement, said shaft having a rear end and a driving end, a lever pivotally mounted to the exterior of said housing adjacent the rear end of said shaft, a thrust bearing journalling the rear end of said shaft in said housing, a cup-shaped member having its edges in contact with said bearing, said cup-shaped member and said bearing being longitudinally slidable in said housing, a flexible diaphragm over-lying said cup-shaped member and mounted on said housing, and a plunger contacting said lever and said diaphragm at a point in line with the center of said cup-shaped member, whereby longitudinal movement of said shaft is transmitted to said bearing, to said cup-shaped member, to said diaphragm, to said plunger, and to said lever.

4. In a worm gear reduction unit, the combination of a housing, a worm shaft mounted in said housing with a slight clearance for relative longitudinal movement, an electric motor for driving said unit, an electric switch for controlling the actuation of said motor, a thrust bearing supporting one end of said worm shaft in said housing, said thrust bearing being slidably mounted in said housing, and means connecting said bearing to said switch whereby said switch is operated upon longitudinal movement of said shaft.

5. In a worm gear reduction unit, the combination of a housing, a worm shaft mounted in said housing with a slight clearance for relative longitudinal movement, said shaft having a rear end and a driving end, a lever pivotally mounted to the exterior of said housing adjacent the rear end of said shaft, a thrust bearing journalling the rear end of said shaft in said housing, a cup-shaped member locked against rotation with respect to said housing and having its edges in contact with said bearing, said cup-shaped member and said bearing being longitudinally slidable in said housing, and sealing means located between said cup-shaped member and the exterior of said housing, said cup-shaped member being connected to said lever whereby longitudinal movement of said shaft is transmitted to said bearing, to said cup-shaped member, and to said lever.

GEORGE H. ACKER.